No. 878,258. PATENTED FEB. 4, 1908.
F. M. VOLK.
NUT LOCK.
APPLICATION FILED APR. 17, 1907.

WITNESSES:

INVENTOR:
Francis M. Volk;
BY
Geo. H. Strong
ATTORNEY

UNITED STATES PATENT OFFICE.

FRANCIS M. VOLK, OF MINTURN, CALIFORNIA.

NUT-LOCK.

No. 878,258.  Specification of Letters Patent.  Patented Feb. 4, 1908.

Application filed April 17, 1907. Serial No. 368,731.

*To all whom it may concern:*

Be it known that I, FRANCIS M. VOLK, citizen of the United States, residing at Minturn, in the county of Madera and State of California, have invented new and useful Improvements in Nut-Locks, of which the following is a specification.

My invention relates to nutlocks. Its object is to provide a simple, cheap and practical device for locking an ordinary nut to an ordinary bolt, and it is designed for use especially in railroad work, bridge construction, and wherever there is a tendency for nuts to work loose, either by reason of constant jarring, or from other causes. Most nutlocks of which I have knowledge, require either a special construction of nut or a special construction of bolt, or both.

The invention consists of the parts and the construction and combination of parts as hereinafter more fully described and claimed, having reference to the accompanying drawings, in which—

Figure 1:
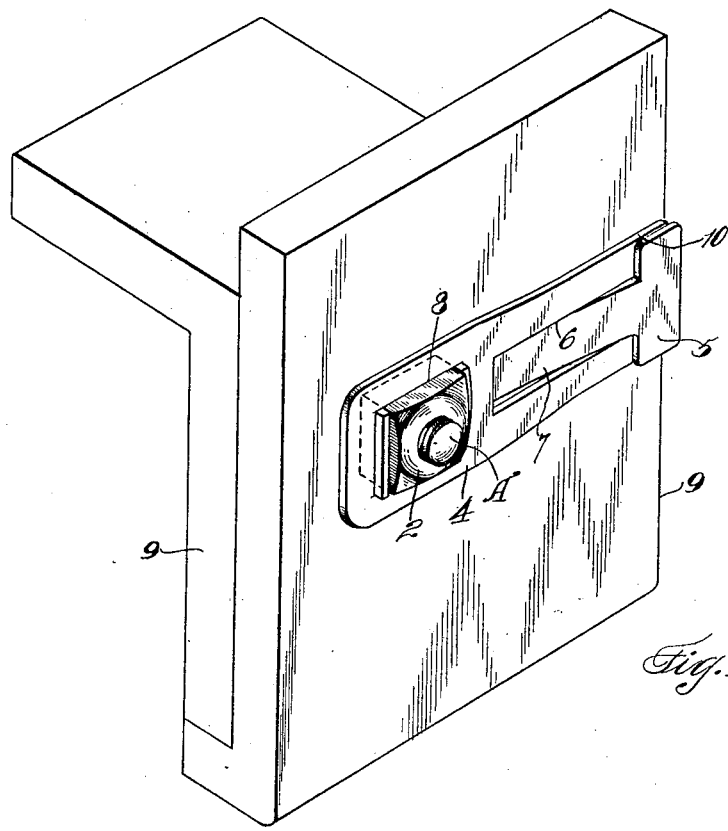
Figure 2:
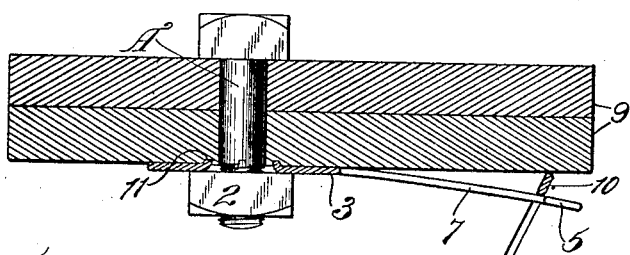

Figure 1 is a perspective view of the device, and Fig. 2 is a partial section showing the lock in open position.

A represents an ordinary bolt provided with the usual square shoulder or having other means to prevent its turning in the thing through which it is inserted, and 2 is the ordinary nut screwing on to the bolt.

My nut locking device consists of two elements, to wit: a spring plate 3 adapted to be clamped between the nut and the plate or timber against which it screws, and a locking-plate or member 4 having a pivotal movement with the spring-member 3 and provided with means to engage the nut to hold the same against turning.

The member 3 consists of a piece of spring steel having a hole near one end to pass the bolt A; the other end of the spring being provided with a cross-head portion 5 which is adapted to be inserted through a slot 6 in the locking-member 4. The width and size of the slot 6 corresponds to the width of the shank portion 7 of the spring just behind the cross-head 5, so that when the cross-head end of the spring is slipped through the slot 6, the plate 4 may be turned to bring its longitudinal axis into a plane substantially coincident with the plane of the longitudinal axis of the spring. The member 4 can then be turned as on a hinge, to and from the spring and nut; the shoulders formed by the cross-head 5 acting as pivots about which the member 4 is turnable.

The free end of the plate 4 has a polygonal opening 8 corresponding to the size and shape of the nut 2, and this opening 8 is so positioned that when the nut is screwed down on to the spring to tighten the bolt and clamp the spring, the plate 4 may be turned to cause the head of the nut to enter the opening 8, whereupon the walls of this opening will embrace the nut and prevent undesired movement of the same.

In practice the bolt is inserted through the timbers or plates represented at 9 which are to be bolted together. The spring plate 3 having been suitably assembled with the locking plate 4, but with the parts opened out, it is then placed over the bolt and the nut 2 screwed down tight into place on the spring to draw the bolt and the parts properly together and thereby clamp the spring flat against the part 9, thus screwing the nut down into place and clamping the spring in the manner shown and described.

The pivotal end of the plate 4 is yieldingly clamped beneath the crosshead 5 and between the latter and the underneath support 9; the portion 10 of plate 4 thus yieldingly clamped between the spring and part 9 forming a fulcrum or purchase to lift the spring and place the same on tension when the plate 4 is lifted or turned outward from the nut. At the same time the tension exerted on the plate by virtue of this underneath fulcrumed portion 10 and the spring, causes plate 4 when turned toward the nut to snap down on top of the spring and over the nut and hold the nut against turning. The tension of the spring is sufficient to keep the plate in locked position, at the same time the locking plate can easily be turned back on its hinge or pivot to allow free access to the nut to permit the same to be removed. By this arrangement the same nuts and bolts can be used over and over again.

In order to prevent the nut locking members 3—4 from turning about the bolt where there is no shoulder or angle to hold them in place, I may provide the underside of the spring with one or more lugs or spurs, bosses or projections 11 adjacent to the hole through which the bolt passes, and which lugs or projections are adapted to engage in suitable recesses in the adjacent face of the part 9. If the latter is of metal, these recesses or indentations to receive the projections may be made by a cold-chisel. If the part 9 is of wood, the projections or serrations 11 will be pressed into the wood when the nut is screwed down to place. In any event the parts 3—4 will be prevented from turning.

It is possible that various changes and modifications may be made in the invention without departing from the principle thereof.

Having thus described my invention, what I claim and desire to secure by Letters Patent, is—

A nutlock comprising the combination of a support, a bolt passing therethrough, a nut on the bolt, a spring-plate adapted to be clamped between the nut and said support, said plate having a cross-head at its outer end, and a locking-plate having an opening in one portion adapted to fit over said nut, said locking-plate having a longitudinally-extending slot formed between said opening and the outer or free end of the plate, the spring-plate passing through the slot in the locking-plate and the free end of the locking-plate passing beneath the cross-head of the spring-plate and adapted to fulcrum against said support, whereby the locking plate is yieldingly-clamped between the spring-plate and the support and serves to lift the spring-plate and place the same under tension when the locking-plate is lifted or turned outward from the nut.

In testimony whereof I have hereunto set my hand in presence of two subscribing witnesses.

FRANCIS M. VOLK.

Witnesses:
J. F. GWIN,
W. J. PATTERSON.